(12) United States Patent
Smith et al.

(10) Patent No.: US 8,831,949 B1
(45) Date of Patent: *Sep. 9, 2014

(54) VOICE RECOGNITION FOR PERFORMING AUTHENTICATION AND COMPLETING TRANSACTIONS IN A SYSTEMS INTERFACE TO LEGACY SYSTEMS

(75) Inventors: Steven G. Smith, Roswell, GA (US); Ralph J. Mills, Atlanta, GA (US); Roland T. Morton, Jr., Atlanta, GA (US); Mitchell E. Davis, Palmetto, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 754 days.

This patent is subject to a terminal disclaimer.

(21) Appl. No.: 09/892,665

(22) Filed: Jun. 28, 2001

(51) Int. Cl.
*G10L 21/00* (2006.01)

(52) U.S. Cl.
USPC ........................................ 704/270; 704/270.1

(58) Field of Classification Search
USPC .............. 704/270, 270.1, 275, 260; 709/201, 709/203, 240, 238, 250; 370/252
See application file for complete search history.

(56) References Cited

U.S. PATENT DOCUMENTS

| | | | |
|---|---|---|---|
| 4,776,016 A * | 10/1988 | Hansen | ........................ 704/275 |
| 4,905,163 A | 2/1990 | Garber | |
| 5,038,283 A | 8/1991 | Caveney | |
| 5,359,649 A | 10/1994 | Rosu et al. | |
| 5,521,958 A | 5/1996 | Selig et al. | |
| 5,570,283 A | 10/1996 | Shoolery et al. | |
| 5,583,937 A | 12/1996 | Ullrich | |
| 5,623,404 A | 4/1997 | Collins et al. | |
| 5,664,110 A | 9/1997 | Green | |
| 5,687,212 A | 11/1997 | Kinser, Jr. et al. | |
| 5,694,323 A | 12/1997 | Koropitzer | |
| 5,696,906 A | 12/1997 | Peters | |
| 5,754,830 A | 5/1998 | Butts | |
| 5,799,279 A | 8/1998 | Gould | |

(Continued)

FOREIGN PATENT DOCUMENTS

| | | |
|---|---|---|
| EP | 0 712 227 | 5/1996 |
| EP | 0732850 | 9/1996 |
| JP | 2000112746 A | 4/2000 |

OTHER PUBLICATIONS

Moran et al ("Multimodal user interfaces in the Open Agent Architecture", Proceedings of the 2nd International conference on Intelligent user interfaces, Aug. 1996).*

(Continued)

*Primary Examiner* — Angela A Armstrong
(74) *Attorney, Agent, or Firm* — Parks IP Law LLC

(57) ABSTRACT

A method and system for a user to access back-end legacy systems via voice input. The user dials-in to a voice server using a portable access device. Using speech synthesis, the voice server provides a menu of operations from which the user can select. By speaking into the access device, the user selects an operation and provides any additional data needed for the operation. Using speech recognition, the voice server prepares a user request based on the spoken user input, that is forwarded to the systems interface, which may include a protocol server for providing a protocol interface and a transaction server for receiving user requests and generating legacy transactions based on the user requests. The systems interface retrieves information from the legacy systems based on the user request that is forwarded to the voice server, which formats and outputs the information to the access device.

19 Claims, 6 Drawing Sheets

(56) References Cited

U.S. PATENT DOCUMENTS

| | | | |
|---|---|---|---|
| 5,805,775 | A | 9/1998 | Eberman |
| 5,812,977 | A | 9/1998 | Douglas |
| 5,826,270 | A | 10/1998 | Rutkowski |
| 5,848,403 | A | 12/1998 | Gabriner et al. |
| 5,857,201 | A | 1/1999 | Wright et al. |
| 5,873,070 | A | 2/1999 | Bunte |
| 5,884,262 | A * | 3/1999 | Wise et al. ............... 704/270.1 |
| 5,884,266 | A * | 3/1999 | Dvorak ................... 704/270.1 |
| 5,896,440 | A | 4/1999 | Reed et al. |
| 5,909,492 | A | 6/1999 | Payne |
| 5,915,001 | A | 6/1999 | Uppaluru |
| 5,920,846 | A | 7/1999 | Storch et al. |
| 5,923,735 | A | 7/1999 | Swartz |
| 5,931,917 | A | 8/1999 | Nguyen et al. |
| 5,953,389 | A | 9/1999 | Pruett |
| 5,960,411 | A | 9/1999 | Hartman et al. |
| 5,963,940 | A | 10/1999 | Liddy |
| 5,970,472 | A | 10/1999 | Allsop |
| 5,974,135 | A | 10/1999 | Breneman |
| 6,023,683 | A | 2/2000 | Johnson et al. |
| 6,023,684 | A | 2/2000 | Pearson |
| 6,026,379 | A | 2/2000 | Haller et al. |
| 6,035,285 | A | 3/2000 | Schect |
| 6,052,785 | A | 4/2000 | Lin |
| 6,058,373 | A | 5/2000 | Blinn |
| 6,080,202 | A * | 6/2000 | Strickland et al. ........... 709/201 |
| 6,081,789 | A | 6/2000 | Purcell et al. |
| 6,092,192 | A * | 7/2000 | Kanevsky et al. ........... 713/186 |
| 6,101,472 | A | 8/2000 | Giangarra |
| 6,101,510 | A | 8/2000 | Stone |
| 6,115,040 | A | 9/2000 | Bladow |
| 6,115,737 | A * | 9/2000 | Ely et al. ................ 709/203 |
| 6,223,541 | B1 | 5/2001 | Farrag |
| 6,226,623 | B1 * | 5/2001 | Schein et al. ............... 709/238 |
| 6,233,541 | B1 | 5/2001 | Butts et al. |
| 6,311,178 | B1 | 10/2001 | Bi |
| 6,324,522 | B2 | 11/2001 | Petersen et al. |
| 6,341,271 | B1 | 1/2002 | Salvo et al. |
| 6,366,829 | B1 | 4/2002 | Wallace et al. |
| 6,389,337 | B1 | 5/2002 | Kolls |
| 6,396,833 | B1 | 5/2002 | Zhang |
| 6,445,774 | B1 | 9/2002 | Kidder |
| 6,473,407 | B1 * | 10/2002 | Ditmer et al. ............... 370/252 |
| 6,487,278 | B1 | 11/2002 | Skladman |
| 6,539,548 | B1 | 3/2003 | Hendricks |
| 6,578,005 | B1 | 6/2003 | Lesaint et al. |
| 6,587,822 | B2 | 7/2003 | Brown |
| 6,587,851 | B1 | 7/2003 | Ditcharo |
| 6,598,167 | B2 | 7/2003 | Devine |
| 6,606,744 | B1 | 8/2003 | Mikurak |
| 6,636,831 | B1 * | 10/2003 | Profit et al. ................. 704/275 |
| 6,671,824 | B1 | 12/2003 | Hyland |
| 6,724,406 | B1 | 4/2004 | Kelley |
| 6,736,376 | B1 | 5/2004 | Delisle |
| 6,738,815 | B1 * | 5/2004 | Willis et al. ................ 709/225 |
| 6,763,376 | B1 | 7/2004 | Devine |
| 6,971,072 | B1 * | 11/2005 | Stein ..................... 715/866 |
| 7,111,243 | B1 | 9/2006 | Ballard |
| 2001/0016819 | A1 | 8/2001 | Kolls |
| 2002/0099642 | A1 | 7/2002 | Schwankl |
| 2002/0103906 | A1 | 8/2002 | Knight |
| 2002/0116282 | A1 | 8/2002 | Martin et al. |
| 2002/0138656 | A1 * | 9/2002 | Hickey ..................... 709/250 |
| 2003/0006913 | A1 * | 1/2003 | Joyce et al. ............... 340/994 |
| 2003/0008661 | A1 * | 1/2003 | Joyce et al. ............... 455/456 |
| 2003/0023601 | A1 | 1/2003 | Fortier |
| 2003/0046397 | A1 | 3/2003 | Trace |
| 2003/0125956 | A1 | 7/2003 | Lewis |
| 2003/0139932 | A1 * | 7/2003 | Shao et al. ................. 704/275 |
| 2004/0014479 | A1 | 1/2004 | Milman |
| 2004/0209602 | A1 * | 10/2004 | Joyce et al. ............... 455/414.1 |

OTHER PUBLICATIONS

Conversay ("Speech Technology Solutions", White Paper © Mar. 2001).*

Commercial Speech Recognition (www.tiac.net/users/rwilcox/speech.htm), Apr. 2001.

IBM Voice Systems (www-4.ibm.com/software/speech), Apr. 2001.

IBM Voice Systems (www-4.ibm.com/software/speech/enterprise), Apr. 2001.

IBM Voice Systems (www-4.ibm.com/software/speech/enterprise/ms_0.html), Apr. 2001.

Metroplex Voice Computing, Inc. (www.metroplexvoice.com), Apr. 2001.

Metroplex Voice Computing, Inc. (www.metroplexvoice.com/toc.htm), Apr. 2001.

Metroplex Voice Computing, Inc. (www.metroplexvoice.com/news.htm), Apr. 2001.

Metroplex Voice Computing, Inc. (www.metroplexvoice.com/products.htm), Apr. 2001.

Metroplex Voice Computing, Inc. (www.metroplexvoice.com/medical_speech_recognition.htm), Apr. 2001.

Voice Recognition Systems Home Page (www.iglou.com/vrsky/rightframe.htm), Apr. 2001.

Lernout & Hauspie (www.lhsl.com/default2.htm), Apr. 2001.

Lernout & Hauspie, "The Language of Business" (www.lhsl.com/business), Apr. 2001.

Lernout & Hauspie, "Voice Xpress" (www.lhsl.com/voicexpress), Apr. 2001.

TMA Associates (www.tmaa.com), Apr. 2001.

TMA Associates, Editor's Notes (May 2000) (www.tmaa.com/voice_web.htm), Apr. 2001.

Fonix (www.fonix.com), Apr. 2001.

Dragon Systems Inc.: Dragon Naturally Speaking Preferred Edition (www.zdnet.com/pcmag/features/speech/rev1.html).

Nuance Verifier 2.0 (www.nuancecom.com/products/verifier.html), Apr. 2001.

Nuance Vocalizer (www.nuancecom.com/products/vocalizer.html), Apr. 2001.

Nuance 7.0 (www.nuancecom.com/products/nuance7.html), Apr. 2001.

Nuance (www.nuancecom.com), Apr. 2001.

Nuance Powers the Voice Web (www.nuancecom.com/partners/voiceweb.html), Apr. 2001.

Nuance Product Offering (www.nuancecom.com/products/products.html), Arp. 2001.

Nuance Voyager (www.nuancecom.com/products/voyager.html), Apr. 2001.

Nuance Solutions (www.nuancecom.com/solutions/solutions.html), Apr. 2001.

Nuance Enterprise Solutions (www.nuancecom.com/solutions/enterprise.html), Apr. 2001.

Nuance Telecom Solutions (www.nuancecom.com/solutions/telecom.html), Apr. 2001.

Nuance Internet Solutions (www.nuancecom.com/solutions/internet.html), Apr. 2001.

Nuance Services (www.nuancecom.com/services/services.html), Apr. 2001.

Nuance Speech Application Design and Development (www.nuancecom.com/services/speech_application_design.html), Apr. 2001.

Delivering Speech Technologies with the Fonix FAAST® Framework, Part I (a white paper), Feb. 2001.

No author; FieldCentrix Selects BellSouth's Intelligent Wireless Network to Bring Wireless Data Solution to Field Service Companies, Aug. 24, 1999; BusinessWire; Dialog copy pp. 1-2.

"Return on Investment Model", web.archive.org webpage of Norand.com, Feb. 6, 1998, pp. 1-5.

"Norand-Payback", web.archive.org webpage of Norand.com, Feb. 6, 1998, pp. 1-2.

"Norand-Products", web.archive.org webpage of Norand.com, Feb 6, 1998, pp. 1-5.

"Norand-Case Study", web.archive.org webpage of Norand.com, Feb. 1998, pp. 1-3.

Haugen, Dyan L.; Hill, Arthur V; "Scheduling to Improve Field Service Quality", Summer 1999, Decision Sciences, 30, 3: ABI/Inform Global, pp. 783-804.

(56) References Cited

OTHER PUBLICATIONS

Freedman, David H; "Case Study: Gas Attack", Aug. 25, 1997, Forbes ASAP Supplement, pp. 45-52, Dialog 01485548 01-36536.

McCarthy, Vince, "The Transformation of the Public Network", Mar. 20, 1995, Telephone, v228n12, pp. 88-100, Dialong 0100552196-54914.

Paz, Noemi M; Leigh, William; "Maintenance scheduling: Issues, results and research needs", 1994, International Journal of Operations & Production Management, v14n8, pp. 47-69, Dialog 00956565 96-05958.

Tseng, Paul C; Lewis, Malcom; "Best Practices and Design Tips", Apr. 1999, Contracting Business, v56, n4, p. 2s84(1), Dialog 06305741 54514903.

Jewett, Dale,; "Service Call", Jul. 21, 1997, Automotive News, p. 61, Dialog 05140584 47847132.

Southerland, Randy; "Not your typical garbagemon", Feb. 2000, Waste Age, 31, 2, ss50, Dialog 11970477 60110303.

"The Luxury Class Database", Apr. 3, 1995, InformationWeek, n 521, p. 100+, Dialong 00593604 23168942.

Ivey, Mike; "Cub: Toughen Penalties vs. Ameritech", Sep. 7, 2000, Madison Captial Times, Madison, Wisconsin, p. 1E, ProQuest ID 59714682.

Jaffe, Charles; "Gas Supplier takes timing seriously if delivers are late, the product is free". Feb. 5, 1989. The Morning Call, Allentown, PA, p. D.01, ProQuest ID 92485879.

Lister, Karen; "Improvements cited in Portland cable service", Jul. 21, 1995, Corpus Christi Caller Times, Corpus Christi, TX., Sec. B, p. 2, ProQuest 6892257.

"Norand-Field Service", web.archive.org webpage of Norand.com., Feb. 6, 1998, pp. 1-2.

"Norand-Training", web.archive.org webpage of Norand.com., Feb. 6, 1998, pp. 1-2.

Wood, Michael; "Fighting the paperwork nemesis", Mar. 1996, American Gas, v78n2, pp. 32-33, Dialog 01179245 98-28640.

"Powering better customer service. (Boston Edison implements mobile computing solution)", May 1997, Communication News, v34, 5n, p. 50(2) Dialog 02070908 19414033.

Kosseff, Jeffrey; "Service Delays May Lead to AT&T Fine", Jul. 18, 2001, The Oregonian, Portland, OR., p. C.01. ProQuest Id 75527844.

Office Action dated Apr. 20, 2005; U.S. Appl. No. 09/892,664, filed Jun. 28, 2001.

Office Action dated Mar. 29, 2006; U.S. Appl. No. 09/892,664, filed Jun. 28, 2001.

Office Action dated Jun. 27, 2007; U.S. Appl. No. 09/892,664, filed Jun. 28, 2001.

Office Action dated Oct. 17, 2007; U.S. Appl. No. 09/892,664, filed Jun. 28, 2001.

Office Action dated Mar. 17, 2004; U.S. Appl. No. 09/892,664, filed Jun. 28, 2001.

Office Action dated Oct. 6, 2005; U.S. Appl. No. 09/892,664, filed Jun. 28, 2001.

Office Action dated Aug. 7, 2006; U.S. Appl. No. 09/892,664, filed Jun. 28, 2001.

Office Action dated Apr. 9, 2007; U.S. Appl. No. 09/892,664, filed Jun. 28, 2001.

Office Action dated Jan. 25, 2008; U.S. Appl. No. 09/892,664, filed Jun. 28, 2001.

Office Action dated Jul. 24, 2008; U.S. Appl. No. 09/892,664, filed Jun. 28, 2001.

Office Action dated Jan. 6, 2009; U.S. Appl. No. 09/892,664, filed Jun. 28, 2001.

U.S. Appl. No. 09/892,664, filed Jun. 28, 2001.

Derfler et al., "How Networks Work", Seventh Ed., Que Corp.

White, Ron, "How Computers Work", Ninth Ed., Que Corp.

Preston, Gralla, "How the Internet Works", Eigth Ed., Que Corp.

* cited by examiner

VOICE RECOGNITION FOR PERFORMING AUTHENTICATION AND COMPLETING TRANSACTIONS IN A SYSTEMS INTERFACE TO LEGACY SYSTEMS

FIELD OF THE INVENTION

The present invention relates generally to the field of telecommunications dispatching and, more particularly, to methods and apparatus for providing user-friendly authentication and access to a systems interface to legacy systems.

BACKGROUND OF THE INVENTION

Telecommunications technicians, such as so-called "Installation and Maintenance" (I&M) technicians, may visit customer sites to install new equipment, set up new services, or to service existing equipment or services. Frequently, I&M technicians need certain information stored on back-end legacy systems to perform a job order. The legacy systems may include dispatch, facilities, and billing systems. The legacy systems may store information such as job assignment, facility assignment, network testing functions, maintenance processes, and customer-specific information.

A typical telephone company, for example, can have a number of such back-end legacy systems that I&M technicians may need to access to perform job orders. These legacy systems can include, for example, a loop facility assignment control system, a loop maintenance operations system, a computer system for main frame operations, a mechanized loop testing system, a secure network element contract server, a mechanized time reporting system, and a work activity statistical sampling plan system. Other back-end legacy and non-legacy systems may exist.

According to a previous approach, technicians could access some information from certain legacy systems using a gateway. For example, BellSouth's I&M technicians use the BellSouth Craft Access System (CAS) gateway. However, access using the gateway had significant limitations. The access was dial-up, meaning that the technician often had to tie up a customer's phone line. Additionally, logging-in and accessing data using CAS was a slow, laborious process. For example, CAS access was sometimes provided via Computer Access Terminals (CATs) using a slow 1.2 kbps connection. Because of the drawbacks of CAS, such as its slow speed, the provision of services by I&M technicians was suboptimal because of delays and impediments to getting the information necessary to complete a job order. In addition, CAS was very difficult to improve. The platform did not lend itself to creating new capabilities due to limited memory and low processor speed.

Moreover, I&M technicians often have poor or suboptimal keyboard skills. Technicians seeking information from legacy system interfaces such as CAS sometimes make mistakes in entering their requests into a computer keyboard. These mistakes can generate user errors that may result in the retrieval of incorrect information or that may result in the delayed retrieval of the correct information. Such user errors can increase the amount of time it takes I&M technicians to complete their job orders. This can increase costs and lead to customer dissatisfaction.

Furthermore, using a CAT terminal or a portable personal computer (PC) to access legacy systems can be very inconvenient to I&M technicians working in the field. A technician making a site visit already has to carry tools, supplies and other equipment to complete many job orders. Carrying an additional five to ten pounds can be very burdensome.

SUMMARY OF THE INVENTION

Accordingly, the present invention is generally directed to a system and method for permitting a user, such as a technician, to access information stored on back-end legacy systems that substantially obviates one or more of the problems due to the limitations and disadvantages of the prior art.

In an embodiment of the present invention, a user such as a technician accesses a systems interface to legacy systems via a front-end voice server. The user dials-in to the voice server using a portable access device. Preferably, the portable access device is a cellular phone. Preferably, the voice recognition server performs voice authentication, speech recognition, and speech synthesis functions. The voice server authenticates the user based on a voice exemplar provided by the user. Using speech synthesis, the voice server provides a menu of operations from which the user can select. By speaking into the access device, the user selects an operation and provides any additional data needed for the operation. Using speech recognition, the voice server prepares a user request based on the spoken user input. The user request is forwarded to the systems interface to the legacy systems. Preferably, the systems interface includes a protocol server for providing a protocol interface and a transaction server for receiving user requests and generating legacy transactions based on the user requests. The systems interface retrieves information from the legacy systems based on the user request and forwards this information to the voice server. The voice server formats the information and outputs the information to the access device. Preferably, the outputted information may be synthesized speech and/or text presented on a display of the access device.

The advantages of the present invention are numerous. The invention permits a user, such as a technician, to remotely access information from back-end legacy systems using a voice input to a systems interface instead of making entries on a keyboard. The voice input can be made over a wireline or over a wireless communications network. Using a voice input to the systems interface can reduce difficulties arising from keyboard entry errors. Using a voice input can also free up the technician to tend to other tasks. Using a voice input can reduce costs and improve customer satisfaction. Using a voice input into a cellular phone rather than a PC alleviates the technician from the burden of having to carry the PC around. In addition, other benefits include lower cost of cell phone in comparison to PCs; less maintenance on cell phone; fewer, if any, software upgrades to be concerned on the cell phone; and ease of adding new functionality because client software does not have to be developed or managed.

DETAILED DESCRIPTION OF THE INVENTION

Figure 1:
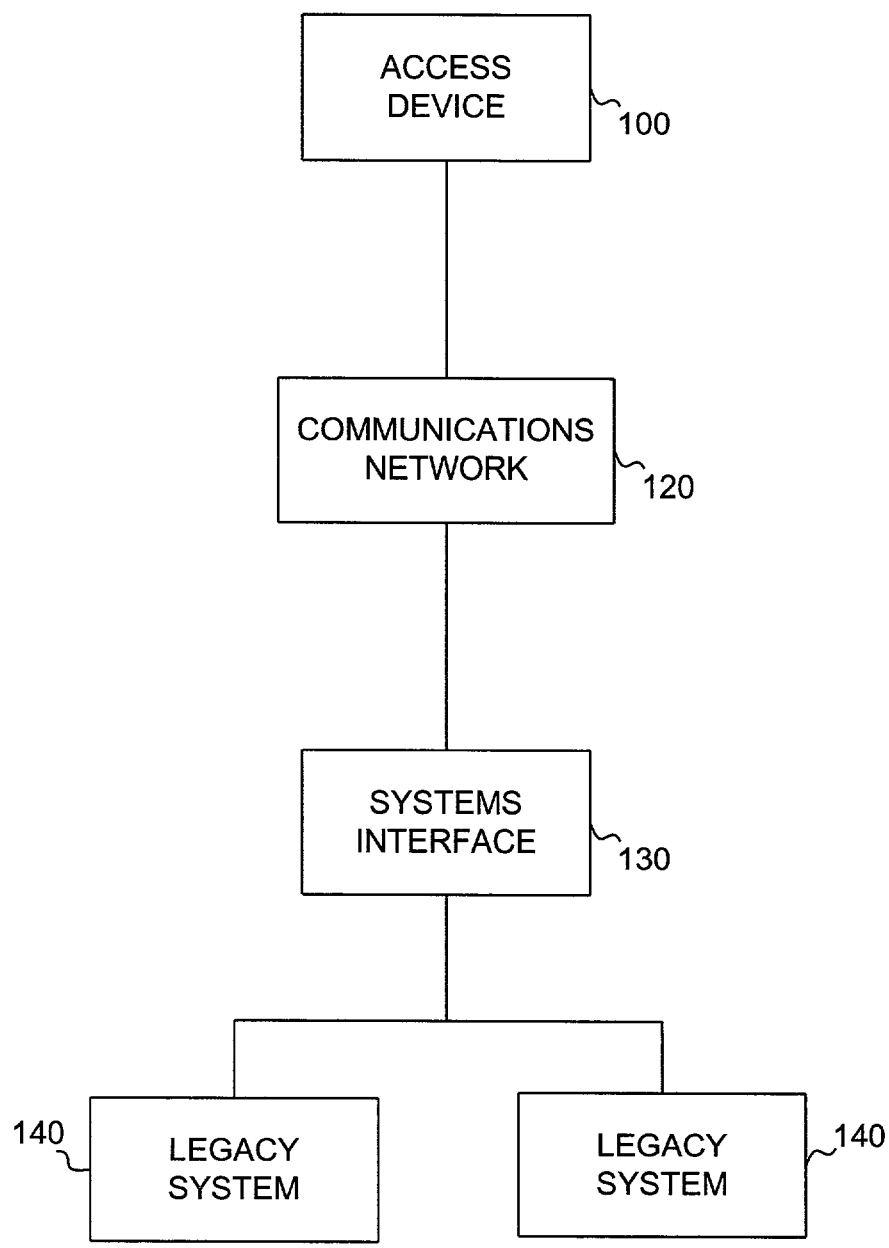
FIG. 1 is a schematic block diagram of a system for allowing users to access information from back-end legacy systems according to an embodiment of the invention.

FIG. 1 is a schematic block diagram of an exemplary system for allowing a user, such as a technician, to access information from back-end legacy systems according to an embodiment of the invention. The system of FIG. 1 includes access device 100, communications network 120, systems interface 130, and back-end legacy systems 140.

Access device 100 is a portable device capable of receiving voice input by a technician or other service person to access information from back-end legacy systems 140. Access device 100 may be a voice-capable personal computer, laptop, personal data assistant, cellular phone, two-way pager, processor, or any portable device capable of receiving voice inputs to be transmitted over a shared network. Preferably, access device 100 is a cellular phone with a display.

Access device 100 remotely accesses systems interface 130 through communications network 120. Communications network 120 may be any communications network that permits a remote computer to access a remote server. Communications network 120 could be a wireline network, wireless or cellular network, satellite network, and so forth. Preferably, communications network 120 is a wireless communications network.

Systems interface 130 provides a systems interface between portable access device 100 seeking data from back-end legacy systems 140. Legacy systems 140 are generally mainframe-type computer systems that maintain data for a company. According to an embodiment, legacy systems 140 may include one or more of the following systems: a loop facility assignment control system; a loop maintenance operations system; a computer system for main frame operations; a mechanized loop testing system; a secure network element contract server; a mechanized time reporting system; and a work activity statistical sampling plan system.

The general operation of the system of FIG. 1 is as follows. A user of access device 100, such as a technician, logs onto systems interface 130 over communications network 120. After the log-on, systems interface 130 permits access device 100 to make requests for information from legacy systems 140. The user can make the requests by voice inputs to systems interface 130. After receiving the voice inputs, systems interface 130 processes the inputs to generate user requests, generates legacy transactions based on the user requests, receives information from legacy systems 140, and transmits the information back to access device 100. Preferably, the information transmitted to access device 100 is voice data to be outputted by a speaker at access device 100 and/or text data to be presented on a display at access device 100.

Figure 2:
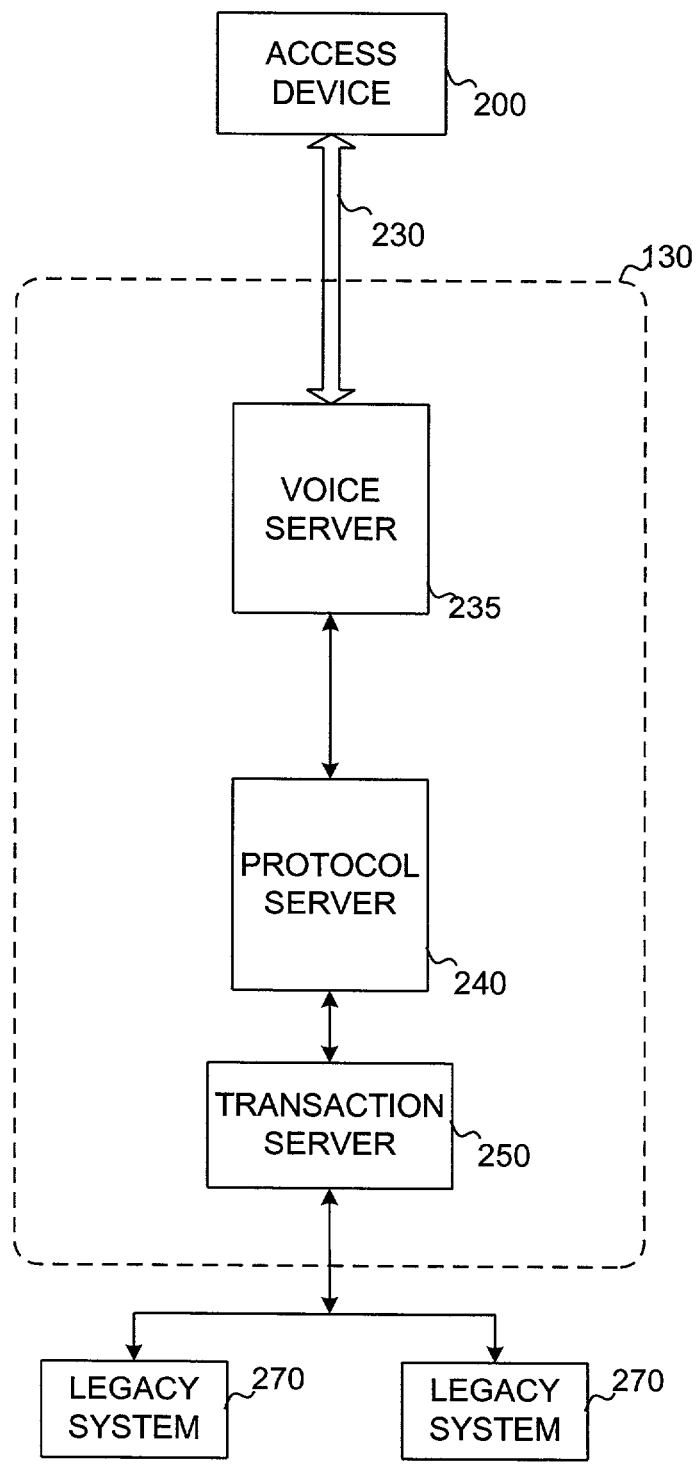
FIG. 2 is a schematic block diagram of a system for allowing users to access information from back-end legacy systems according to an embodiment of the invention.

FIG. 2 is a schematic block diagram of an exemplary preferred systems interface 130 for allowing technicians to access information from legacy systems using voice inputs according to an embodiment of the invention. The system of FIG. 2 includes access device 200, communications network 230, voice server 235, at least one protocol server 240, at least one transaction server 250, and legacy systems 270.

Access device 200 may be any of the devices discussed above for access device 100 (FIG. 1). Preferably, access device 200 is a cellular phone with a display.

Communications network 230 may be a wireline communications network, or wireless communications network. Preferably, communications network 230 is a wireless or cellular communications network. For example, communications network 230 may be the Legacy systems 270 are similar to and include any of the variations discussed in connection with legacy systems 140 of FIG. 1.

In accordance with FIG. 2, access device 200 accesses legacy systems 270 through a systems interface 130. Systems interface 130 includes voice server 235, protocol server 240, and transaction server 250.

Generally, protocol server 240 provides a protocol and middleware interface between access device 200 (through voice server 235) and transaction server 250. Protocol server 240 may receive user requests or other messages from access device 200; route requests or messages to transaction server 250; receive responsive information from transaction server 250; and route responsive information back to voice server 235 (through access device 200).

Generally, transaction server 250 provides an interface to back-end legacy systems 270 so that responsive information can be retrieved. Transaction server 250 may service requests, generate legacy transactions in response to those requests, and receive responsive information to be forwarded back to protocol server 240.

The preferred protocol server 240 and transaction server 250 are disclosed in the copending, commonly owned, U.S. patent application Ser. No. 09/343,815, entitled "Systems and Methods for Utilizing a Communications Network for Providing Mobile Users Access to Legacy Systems (hereinafter, referred to as "the '815 application"), filed on Jun. 30, 1999, the entirety of which is hereby incorporated by reference. The preferred systems interface (not include the voice server) is described in the aforementioned application in connection with the disclosed "TECHNET" system.

In particular, preferred protocol servers/or servers 240 are disclosed in the '815 application as the "protocol servers," which may include any associated hardware and/or software disclosed in connection therewith. Preferred transaction servers 250 are disclosed in the '815 application as the "TechNet servers," which may include any associated hardware and/or software disclosed in connection therewith.

Voice server 235 provides an interface between access device 200 and the rest of the system so that the generally "voice in, voice out" feature of the present invention is substantially transparent to protocol server 240 and transaction server 250. Voice server 235 also authenticates the user via a combination of voice print identification and queries to the user at login.

Regarding input, voice server 235 prepares user requests and other messages (e.g., a log-in attempt) based on voice inputs. Therefore, although requests originate as voice inputs from a conventional device, such as a cell phone, the user requests forwarded by voice server 235 have the same format as if they were prepared by a computer with specialized client software, such as the "TechNet client software" disclosed in the '815 application.

Regarding output, voice server 235 processes responsive information returned by protocol server 235 in order to provide an output appropriate for access device 200. For example, voice server 235 processes the responsive information to provide a speech output and/or text output that can be presented by the speaker or display (respectively) of a cellular phone. Voice server 235 can be programmed with a series of preformatted queries that it suggests to the user. The user selects which query or function he wishes to invoke and provides any additional information requested by voice server 235 such as a customer's telephone number. The voice server 235, after all required information is provided by the user, can then provide confirmation/acknowledgement of the data received and transmits the query on to the transaction server 250 via protocol server 240.

Voice server 235 can be a dial-in type device that can be accessed by access device 200 dialing-in over a wireline or wireless network. Preferably, voice server 235 is accessed via a dedicated number (e.g., so-called "800" or "888" number) in a wireless network. Preferably, voice server 235 can perform three main operations: voice authentication, voice recognition, and voice synthesis, discussed in greater detail below.

Voice server 235, protocol server 240 and transaction server 250 are depicted in FIG. 2 as separate servers for purposes of clarity and illustration. The operations performed by voice server 235, protocol server 240 and transaction server 250 could easily be combined and performed on a single server. On the other hand, the operations could easily be further subdivided and performed on additional servers. It should also be understood that the term "server" is intended to encompass variations such as processor, microprocessor, computer, minicomputer, microcomputer, and so forth.

The general operation of the preferred system of FIG. 2 is now described. A user, such as a technician, dials-in to voice server 235, preferably by dialing a dedicated number associated with wireless communications network 230. Voice server 235 uses synthesized speech to request a voice exemplar for log-in. The user provides a speech exemplar. Voice server 235 processes the voice exemplar to extract a voiceprint or other mathematical characterization of the user's voice. The extracted characterization is compared to a database of characterizations in order to identify the user. Based on the user's identity, the information typically required to log onto protocol server 240 (e.g., a user name and password or primary group address) is retrieved. This retrieved information is forwarded by voice server 235 to protocol server 240 to effectuate the log-on.

Following log-on, voice server 235 uses speech synthesis to provide a menu of operations from which the user can select. The user selects an operation using voice input that is interpreted using the speech recognition capability of voice server 235. Alternatively or in addition, voice server 235 could number the operations, and the user could input a selection by speaking an appropriate number on a cell phone. The user may also speak a command. For example, the user can say: "Change Cable Pair," and the system will jump to that transaction without going through the list of functions that is available to the user. Alternatively, if the user is not familiar with the system, the user can wait to hear the list provided by the system and select an appropriate operation.

After selecting an operation, the user may need to input additional information used to complete the data fields associated with the user request corresponding to that operation. For example, if the operation is "Get Client Account Information," other data such as a name, account number, phone number, and so forth must be provided. Voice server 235 may use its voice synthesis capability to provide a prompt for such additional information. For example, voice server 235 may send the following voice synthesized statement: "Please state the customer's account number" or "Please state the customer's phone number," and so forth. The user provides a voice input for this other data, which is processed using the speech recognition feature of voice server 235.

Voice server 235 formats a user request based on the voice inputs provided from access device 200. The user request is forwarded to protocol server 240 and transaction server 250, which process the request to retrieve responsive information from legacy systems 270. The responsive information is sent to voice server 235.

Voice server 235 processes the responsive information to format an output appropriate for an access device 200. Access device 200 has limitations regarding the volume of data it can present by voice output or display. Voice server 235 may take these limitations into account when formatting output. For example, voice server 235 may limit the amount of data that can be presented. If the volume of responsive information exceeds some amount, voice server 235 may output a message similar to the following: "The volume of responsive information to your request requires that you resubmit the request using your PC."

Otherwise, voice server 235 converts the responsive information into voice output or text output, or both, that is transmitted to access device 200. Voice output will be heard by the user listening to the speaker at access device 200. Text output will be read by the user viewing the display at access device 200. Preferably, the user can, for example, tell the system to "send output to digital display." Alternatively, if the user does not provide any instructions, the system can be adapted to simply speak the output to the user. In other words, the user can program so that the system can either output by voice or text, or both.

Figure 3:
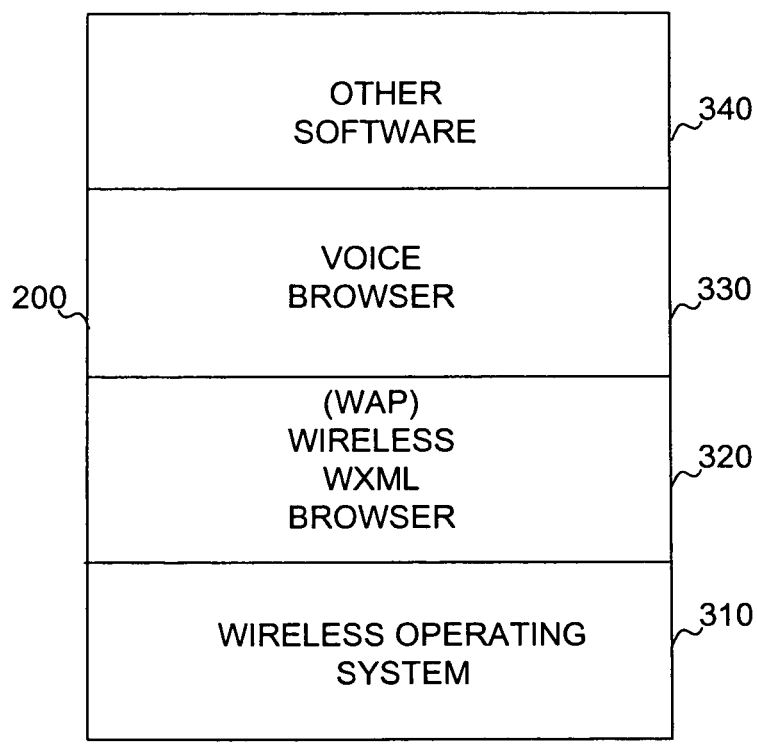
FIG. 3 is a schematic diagram of the software configuration of an access device used in accordance with an embodiment of the invention.

FIG. 3 is a schematic diagram of an exemplary software configuration of an access device 200 used in accordance with an embodiment of the invention. According to FIG. 3, access device 200 is programmed with wireless operating system 310, wireless browser 320, voice browser 330, and other software 340.

Wireless operating system 310 can be a conventional operating system for a wireless device, such as a RIM 950 or RIM 957 (trademarks of Research in Motion Ltd.) interactive pager or a WAP-enabled cell phone device.

Wireless browser 320 provides an interface so that text data sent in WXML or WAP format can be interpreted and presented on the display of access device 200.

Voice browser 330 can be a commercially available voice browser, such as the Nuance Voyager product sold by Nuance Communications. Users can access Voice XML enabled websites. Some websites have recognized the market potential for cell phone access and they have created voice XML access as well as WAP access for digital devices.

Figure 4:
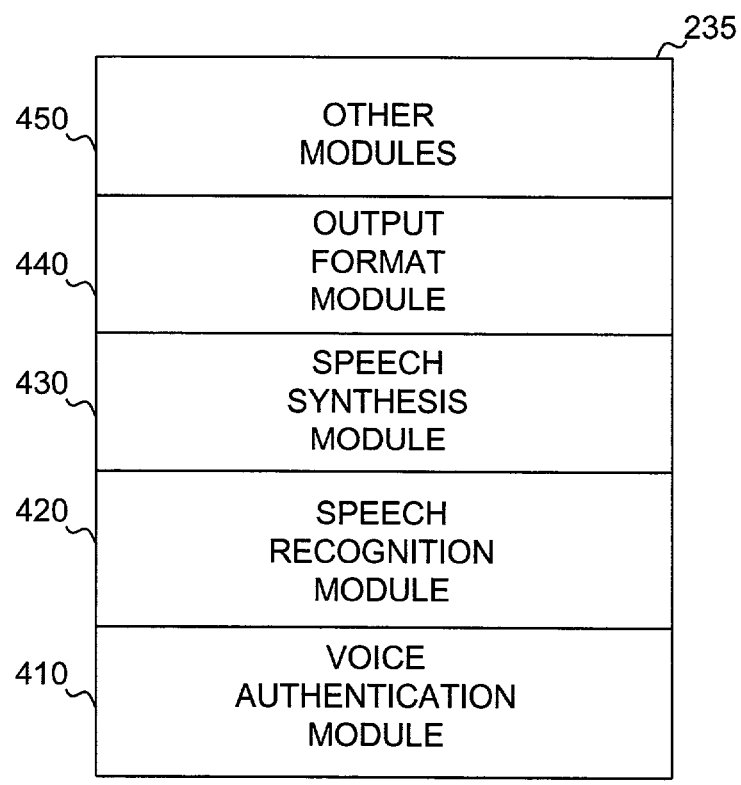
FIG. 4 is a schematic diagram of the software configuration of an exemplary voice server used in accordance with an embodiment of the invention.

FIG. 4 is a schematic diagram of an exemplary software configuration of an exemplary voice server 235 used in accordance with an embodiment of the invention. For purposes of illustration, FIG. 4 is described in connection with some of the structure of FIG. 2. However, this is only for purposes of explaining the invention, and the exemplary software configuration of FIG. 4 should not be considered to be limited by the structure of FIG. 2 or any other structure.

According to FIG. 4, voice server 235 is programmed with voice authentication module 410, speech recognition module 420, speech synthesis module 430, output format module 440, and other modules 450.

Voice authentication module 410 performs user authentication by extracting a voiceprint or like characterization of a user exemplar. Voice authentication module 410 may also look up log-on data (e.g., user ID and password) that can be forwarded to protocol server 240 (FIG. 2) so that the log-in is transparent. Voice authentication module 410 can be custom software, or it could be adapted or prepared from a commercially available product. A number of authentication software products are presently available. Preferably, voice authentication module 410 is based on the NUANCE VERIFIER 2.0 (Nuance Communications of Menlo Park, Calif.).

Speech recognition module 420 performs speech recognition by processing voice input from the user of access device 200 (FIG. 2). Speech recognition module 420 interprets voice inputs corresponding to the selection of an operation, the input of data for data fields for the operation, and so forth. Speech recognition module 420 uses these voice inputs to prepare user requests that are recognized by protocol server 240 (FIG. 2).

Speech recognition module 420 can be custom software, or it could be adapted or prepared from a commercially available product. A number of speech recognition software products are presently available. Commercially available speech recognition applications include those sold by United Research Labs (e.g., VoiceAction), Dragon Systems (e.g., NaturallySpeaking® and DragonDictate®), IBM (ViaVoice®, Natural Language Understanding), Lemour & Houspie (e.g., Voice Xpress), Phillips Speech Processing (e.g., FreeSpeech98), Verbex Voice Systems (e.g., Listen for Windows). Preferably, speech recognition module 420 is prepared based on the Nuance 7.0 product sold by Nuance Communications.

Speech synthesis module 430 performs speech synthesis to provide voice output to access device 200 (FIG. 2). This voice output includes prompts made to the user, such as for a log-in exemplar, for an operation selection, or for other data needed to prepare the user request. The voice output also includes the output of responsive information from legacy systems 270 (FIG. 2) based on a user request. For voice output of responsive information, speech synthesis module 430 may receive text or characters from output format module 440 that are converted to speech in a text-to-speech (TTS) operation.

Speech synthesis module 430 can be custom software, or it could be adapted or prepared from a commercially available product. A number of synthesis software products are presently available from distributors such as those listed above for speech recognition module 420. Preferably, speech synthesis module 430 is based on the NUANCE VOCALIZER 1.0 product sold by Nuance Communications.

Output format module 440 formats responsive information received from protocol server 240 into an output appropriate for access device 200. Output format module 440 may determine when the volume of responsive information exceeds an amount that can be outputted by access device 200 (FIG. 2). Output format module 440 may include logic that determines what information should be outputted as voice output and what should be outputted as text output. Information that is to be outputted as voice output may be passed to speech synthesis module 430 for TTS conversion. Preferably, pre-established queries on voice server 235 can limit large amounts of data from being returned to the user. For example, voice server 235 can be adapted so that queries that may result in large amounts of date are not returned via voice. An overlay digital data (TechNet) application can be used to provide the ability to get the massive amounts of data required for service order details and other data-intensive requests. Other module 450 refers to any other modules that might be used by voice server 235.

Figure 5:
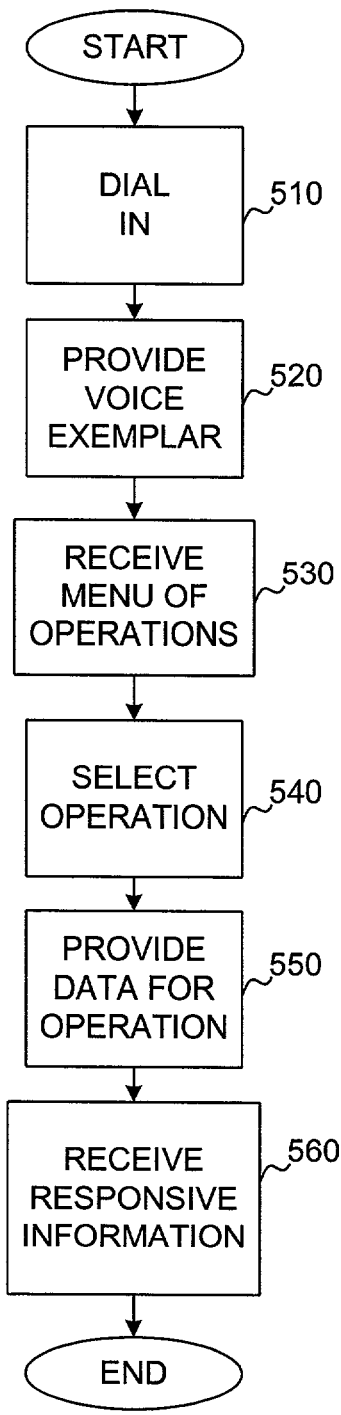
FIG. 5 is a flow diagram of a method for a user to retrieve information from a back-end legacy system using a voice input according to an embodiment of the invention.

FIG. 5 is a flow diagram of a method for a user to retrieve information from a back-end legacy system using a voice input according to an embodiment of the invention. To explain and illustrate the invention, FIG. 5 is discussed in connection with structure from FIG. 2. However, the method of FIG. 5 is not to be considered as limited to or constrained by the structure of FIG. 2 or any other structure.

In step 510, the user dials in to a voice server at the front-end of a systems interface to legacy systems. For example, a user of access device 200 may dial-in to voice server 235 (FIG. 2).

In step 520, the user provides a voice exemplar. Alternatively, the user may state, what he wants to do. He may state, for example, "Get candidate pairs for my job" and the system will perform a candidate pair transaction. If the user does not remember the command, he can wait for the system prompts as described in 530.

In step 530, the user receives a menu of operations from which to select. For example, voice server 235 may provide a voice output of the menu to access device 200.

In step 540, the user selects an operation. For example, the user may provide a voice input corresponding to one of the operations from the menu.

In step 550, the user provides other data for the operation. For example, the user may provide data such as a customer name, account number, or other data that is needed for the user request.

In step 560, the user receives the responsive information. For example, the user may receive the responsive information as a synthesized voice output from a speaker at access device 200. For example, the user may receive the responsive information as text output presented by a display at access device 200.

Figure 6:
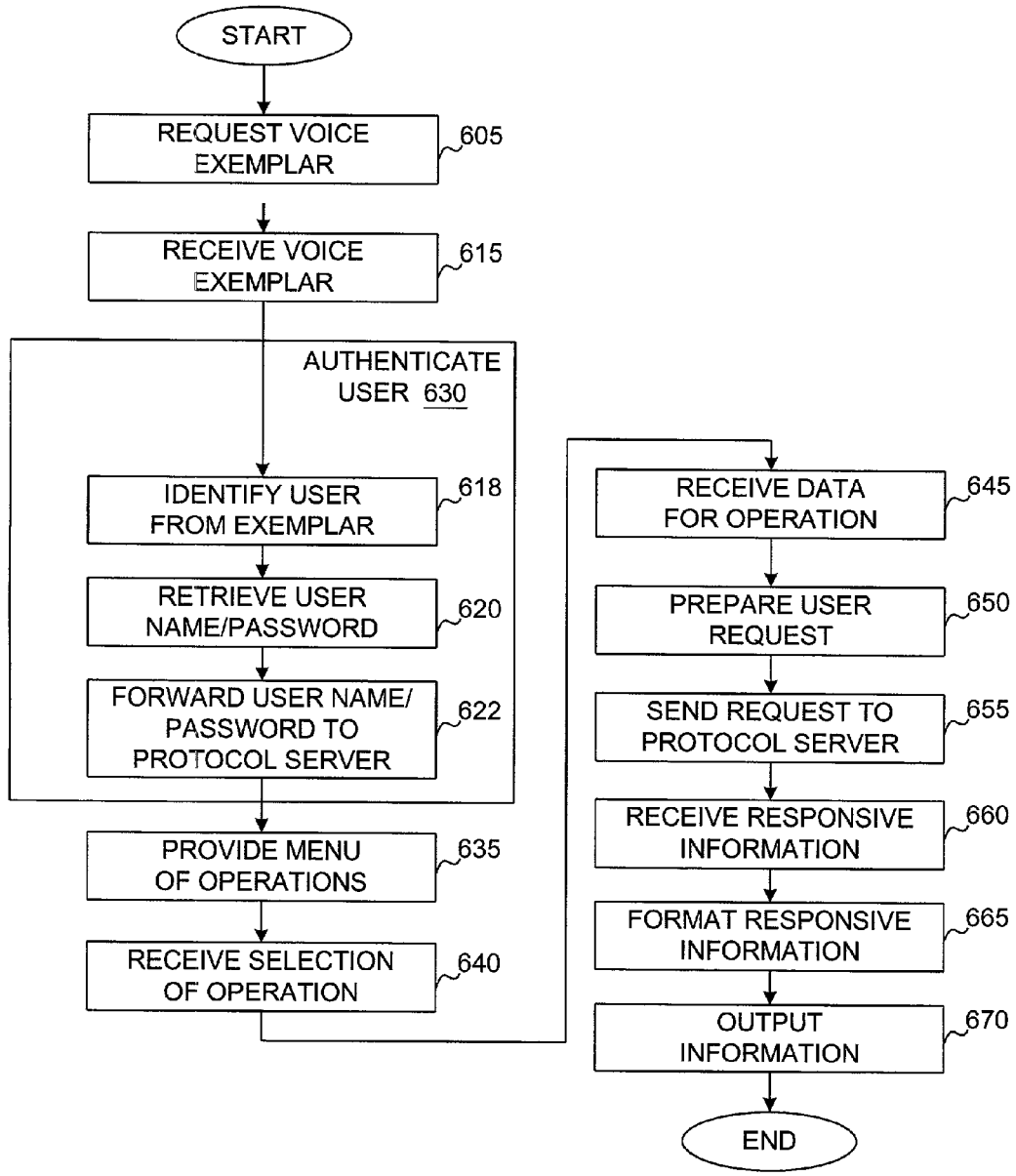
FIG. 6 is a flow diagram of a method for allowing a user to retrieve information from a back-end legacy system using a voice input according to an embodiment of the invention.

FIG. 6 is a flow diagram of a method for allowing a user to retrieve information from a back-end legacy system using a voice input according to an embodiment of the invention. To explain and illustrate the invention, FIG. 6 is discussed in connection with structure from FIG. 2. However, the method of FIG. 6 is not to be considered as limited to or constrained by the structure of FIG. 2 or any other structure.

In step 605, a request is made for a voice exemplar. For example, voice server 235 (FIG. 2) may make a voice synthesized prompt to the user of access device 200 (FIG. 2).

In step 615, a voice exemplar is received. For example, voice server 235 (FIG. 2) may receive a voice exemplar based on a voice input by the user of access device 200 (FIG. 2).

In step 630, the user is authenticated for the log-in. According to an embodiment, the step of authenticating the user may include steps 618-622. In step 618, the user is identified from the received voice exemplar. For example, voice server 235 (FIG. 2) may process the received voice exemplar to generate a voiceprint that is compared to a database of voiceprints to identify the user. In step 620, a user name and password (or similar code) is retrieved for the identified user. In step 622, the user name and password (or similar code) is forwarded to the protocol server. For example, the user name and password (or similar code) may be forwarded to protocol server 240 to complete the log-in in a transparent manner.

In step 635, a menu of operations is provided. The menu may be provided as previously discussed.

In step 640, a selected operation is received. For example, voice server 235 (FIG. 2) may receive a voice input selection from the user of access device 200 (FIG. 2).

In step 645, other data needed for the operation is received. For example, voice server 235 (FIG. 2) may receive additional voice inputs used to complete data fields corresponding to the user request.

In step 650, a user request corresponding to the voice inputs for steps 640 and 645 is prepared.

In step 655, the user request is sent to the protocol server (e.g., protocol server 240 of FIG. 2).

In step 660, the responsive information corresponding to the user request is received. For example, protocol server 240 may forward responsive information that was based on a legacy transaction generated by transaction server 250 that was run against legacy systems 270.

In step 665, the responsive information is formatted. For example, voice server 235 may format the responsive information for appropriate output to access device 200 as synthesized voice or text.

Finally, in step 670, the information is output to the access device.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for permitting a user to remotely access data, comprising:
    an access device operated by the user; and
    a systems interface to a plurality of legacy systems, the systems interface comprising:
        a plurality of first servers for managing protocol, each of the plurality of first servers comprising an application programming interface (API) server,
        a second server for generating legacy transactions comprising an API client server in communication with the API server of each of the plurality of first servers, and
        a third server for providing a voice interface in communication with the plurality of first servers,
    wherein the third server is adapted to receive voice inputs from the access device, format the voice inputs into a user request recognized by the plurality of first servers and forward the user request to one of the plurality of first servers, the user request being a request to retrieve responsive information from the plurality of legacy systems by the second server,
    wherein the third server comprises logic for choosing from among a plurality of output formats for outputting the responsive information, the output formats comprising speech synthesized data to be heard by the user of the access device and text data to be presented to the user on a display on the access device,
    wherein the third server is adapted such that if the user request is a data-intensive request, the responsive information is output via text data, the data-intensive request comprising a request for service order details to be retrieved from the plurality of legacy systems, and
    wherein further the third server provides the user a menu of operations associated with the plurality of legacy systems.

2. The system of claim 1, wherein the access device accesses the third server over a wireless communications network.

3. The system of claim 1, wherein the voice inputs include a voice exemplar provided by the user to log onto the systems interface.

4. The system of claim 3, wherein the third server is adapted to identify the user based on the voice exemplar, and wherein the third server is adapted to forward log-on information to the first server so that the user can be logged on.

5. The system of claim 4, wherein the log-on information comprises a user identification (user ID) and password retrieved based on the voice exemplar.

6. The system of claim 1, wherein the user request is to retrieve responsive information from the legacy systems.

7. The system of claim 1, wherein the third server receives the responsive information based on the legacy transactions, and wherein the third server formats the responsive information into an output for the access device.

8. A system for permitting a user to remotely access data, comprising:
    a systems interface to a plurality of legacy systems, the systems interface comprising a plurality of protocol servers, each protocol server further comprising an application programming interface (API) server, a transaction server further comprising an API client, and means for providing a voice interface,
        wherein the means for providing a voice interface is in communication with each of the plurality of protocol servers, each of the plurality of protocol servers is in communication with the transaction server and the transaction server is in communication with the plurality of legacy systems,
        wherein further each of the plurality of protocol servers communicates with the API client of the transaction server via its own API server; and
    an access device operable by the user to retrieve responsive information from the legacy systems by sending voice inputs to the systems interface,
        wherein the means for providing a voice interface is programmed with software for converting the voice inputs into a user request and for converting the responsive information based on the user request into an output that can be presented by the access device, the means for providing a voice interface comprising logic for choosing from among a plurality of output formats for outputting the responsive information, the output formats comprising speech synthesized data to be heard by the user of the access device and text data to be presented to the user on a display on the access device, wherein further the means for providing a voice interface is adapted such that if the user request is a data-intensive request, the responsive information is not output via speech synthesized data, the data-intensive request comprising a request for service order details to be retrieved from the plurality of legacy systems, and wherein further the means for providing a voice interface provides the user a menu of operations associated with the plurality of legacy systems.

9. The system of claim 8, wherein the software includes a voice authentication module, a speech recognition module, and a speech synthesis module.

10. The system of claim 8, wherein the means for providing a voice interface is further programmed with software to provide a speech synthesized prompt to the user.

11. The system of claim 10, wherein the prompt requests a voice exemplar for logging in.

12. The system of claim 10, wherein the prompt requests that the user selects an operation associated with the plurality of legacy systems.

13. The system of claim 10, wherein the prompt requests that the user provide other data needed to prepare the user request.

14. A system for remotely accessing legacy data through a systems interface to a plurality of legacy systems, comprising:
- a wireless communications link;
- an access device operated by a user over the wireless communications link;
- a plurality of protocol servers interfacing with a transaction server which is in direct communication with the plurality of legacy systems for receiving a user request and for providing responsive information from the plurality of legacy systems based on the user request;
- an application programming interface (API) server resident within each of the plurality of protocol servers;
- an API client resident within the transaction server whereby the transaction server is enabled to communicate with each of the protocol servers via the API server resident within each of the protocol servers; and
- a voice server in direct communication with the access device and each of the plurality of protocol servers, wherein the voice server includes at least one memory programmed with software for performing the following:
  - receiving a voice exemplar,
  - authenticating the user based on the voice exemplar,
  - receiving voice inputs from the user,
  - providing a menu of operations associated with the plurality of legacy systems to the user,
  - converting the voice inputs into the user request,
  - sending the user request to the protocol server,
  - receiving the responsive information, and
  - formatting the responsive information into an output wherein the voice server comprises logic for choosing from among a plurality of output formats for outputting the responsive information, the output formats comprising speech synthesized data to be heard by the user of the access device and text data to be presented to the user on a display on the access device, wherein the voice server is adapted such that if the user request is a data-intensive request, the responsive information is not output via speech synthesized data, wherein the data-intensive request comprises a request for service order details to be retrieved from the plurality of legacy systems.

15. The system of claim 14, wherein the software comprises a voice authentication module, a speech recognition module, and a speech synthesis module.

16. The system of claim 14, wherein the voice inputs comprises a selection of an option and data for that option.

17. A method for allowing a user to access data within a legacy system, comprising:
- receiving a first voice input from a user of an access device;
- processing the first voice input to authenticate the user;
- providing a menu to the user, wherein the menu includes information associated with an operation associated with a legacy system;
- receiving a second voice input from the user for selecting the operation associated with the legacy system from the menu;
- receiving a third voice input from the user for providing data for the operation;
- preparing a user request based on the second voice input and the third voice input;
- transmitting the request to the legacy system via a communications interface comprising:
  - a plurality of protocol servers, each of the plurality of protocol servers further comprising an application program interface (API) server, and
  - a transaction server further comprising an API client whereby each of the plurality of protocol servers communicates with the transaction server;
- receiving responsive information from a legacy system via the communications interface based on the user request; and
- formatting the responsive information into an output for the access device, wherein the output includes voice synthesized data,
- wherein the voice inputs are received at a voice server that is in communication with at least one of the plurality of protocol servers, the voice server comprising logic for choosing from among a plurality of output formats for outputting the responsive information, the output formats comprising speech synthesized data to be heard by the user of the access device and text data to be presented to the user on a display on the access device, and
- wherein further the voice server is adapted such that if the user request is a data-intensive request, the responsive information is not output via speech synthesized data, the data-intensive request comprising a request for service order details to be retrieved from the legacy system.

18. The method of claim 17, wherein the step of processing the first voice input includes identifying the user and forwarding log-in data to the protocol server to effectuate a log-in.

19. The method of claim 17, further comprising the step of sending the user request to the protocol server.

* * * * *